CONTROL CIRCUIT FOR MULTISTAGE CROSSPOINT NETWORK

Filed July 7, 1966 2 Sheets-Sheet 1

CONTROL CIRCUIT FOR MULTISTAGE CROSSPOINT NETWORK

Filed July 7, 1966 2 Sheets-Sheet 2

United States Patent Office
3,515,808
Patented June 2, 1970

3,515,808

CONTROL CIRCUIT FOR MULTISTAGE CROSSPOINT NETWORK

Dieter Niedergesäss, Schwieberdingen, Germany, assignor to International Standard Electric Corporation, New York, N.Y., a corporation of Delaware Filed July 7, 1966, Ser. No. 563,407
Claims priority, application Germany, July 21, 1965, St 24,162
Int. Cl. H04q 3/54
U.S. Cl. 179—18 7 Claims

ABSTRACT OF THE DISCLOSURE

Marking of switching stages in a control circuit is provided by signals from coincidence circuits. The coincidence circuits in turn are operated in response to coincidence between signals applied over a wire network representing a program and timing pulses from a centrally arranged clock pulse generator.

The invention relates to control circuits for multistage crosspoint networks with glass reed contacts having so called adhesive characteristics.

A characteristic of adhesive contacts is that they remain open or closed without a continuous flow of current. They may depend upon permanent magnetism, or other electrical, magnetic or mechanical characteristics to hold themselves in their last operated condition. If a crosspoint arrangement shows adhesive characteristics, the setting and releasing functions are generally accomplished by the application of suitably poled marking pulses to all crosspoint elements in the different switching stages which are participating in establishing a connection.

To this end, known methods of marking provide a central clock pulse generator which has as many timing pulses in a cycle as there are switching stages in the network. A particular clock pulse is associated with each switching stage. Such a method of marking has the drawback that it is not sufficiently flexible for the different partial or complete connections which must be established, for example, in a telephone exchange system. In the central marking logic circuits must have the capability of selecting the desired timing or clock pulses, if a switch path connection is not to be completed across all switching stages. Another disadvantage is that the sequence of marking the switching stages changes during the establishment of different types of connections or at different exchanges. For example, the establishment and the release of a connection involve a different sequence of events. Such an influence on the marking pulses necessitates a further expenditure in the marking logical circuits to switch over the clock pulse generator.

An object of the invention is to provide for the marking of multistage crosspoint arrangements having crosspoints with an adhesive characteristic. A more particular object is to provide such equipment for use in telecommunications and particularly in telephone exchange systems. A further object is to provide means whereby any arbitrary switching process can be marked either individually or simultaneously in any of the switching stages. In this connection, an object is to provide means whereby the timely sequence can also be selected arbitrarily.

According to the invention, the marking potential is applied to the switching stages of the crosspoint arrangement via coincidence or AND circuits. These circuits are actuated in case of coincidence between an arbitrarily marked program and an arbitrary timing pulse of a centrally arranged clock pulse generator. Through this coincidence, the moment and the sequence of marking the switching stages can be determined arbitrarily. The marking logical circuits are made simpler because they have only to determine the program. This program may concern the establishment of a connection between a calling subscriber and junction set, between a junction set and register, or between a junction set and called subscriber.

This coincidence of the marking of a particular program by a timing pulse offers the maximum flexibility for the control of the system. For example, any particular switching stage can be marked by any one of many different programs during the same timing pulse. It is also possible to apply the same program to mark a switching stage during several timing pulses. Finally, a particular switching stage can be marked with several different programs during equal timing pulses. In any case, the coincidence circuit associated with a switching stage can be operated through suitable markings representing the different programs and the different timing pulses. These markings may be applied at any time and at a distinctly defined program run-down.

Crosspoint arrangements wih adhesive characteristics frequently require a different marking potential in order to carry out the marking when establishing or releasing a connection. The invention offers a very simple solution to the resulting problems because the polarity and potential of the output signal is determined for the coincidence circuits by the program which is selected.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
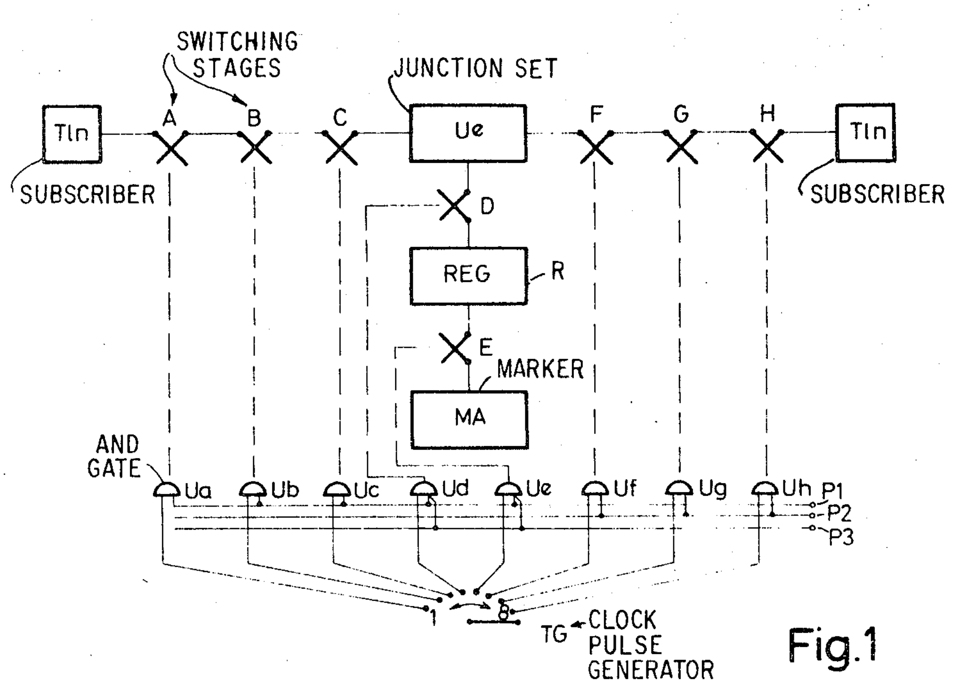
FIG. 1 shows the block diagram of a telephone exchange system to explain the new method of marking.

The invention, as it may be used in a telephone exchange system, is described with the aid of FIG. 1. The switching stages are always marked, in whole or in part, in the same sequence, here disclosed by the alphabetical sequence of the letters A–H. The program to be followed while a path is being established is selected via the marking logical circuit. For example, a program P1 may control the establishment of a connection via the switching stages A to C and D to E. The calling subscriber station is then connected with a register R and a marker MA via a junction set U*e*. The centrally arranged clock pulse generator TG has an output cycle including eight timing pulses, corresponding to the number of the switching stages A–H. Thus, the timing generator is shown as a pulse distributor having steps "1" to "8." The aforementioned connection is thus established, stage by stage, starting from the switching stage A and extending to the switching stage E. For this reason, the wire P1 is shown as being connected to the AND gates U*a*–U*e*, but as not being connected to the AND gates U*f*–U*h*. When selecting the program P2, a connection is established between the junction set U*e* and the called subscriber station via the switching stages F, G and H. The associated coincidence circuits U*f*, U*g* and U*h* are, therefore, connected to wire P2 to control the esttablishment of the switch path in response to the timing pulses "6," "7" and "8." During the program P3, the register REG and the marker MA are once more connected with the junction set U*e*. To this end, the coincidence circuits U*d* and U*e* are operated off the P3 wire during the timing pulses "4" and "5." The switching stages D and E are marked at this time.

If the sequence of marking the switching stages should be reversed to follow an inverted alphabetical order, the clock pulse generator TG is operated to run in the reversed direction.

Figure 2:
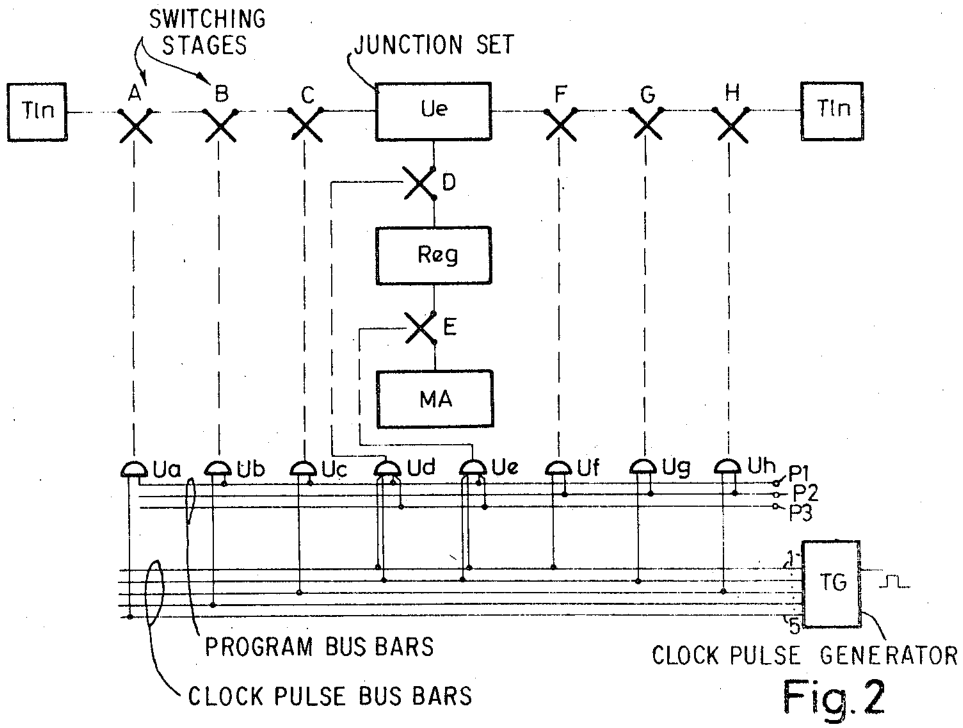
FIG. 2 shows a block diagram illustrating an example of the association of the timing pulses.

The block diagram in FIG. 2 shows a telephone exchange system, corresponding in its construction to the one shown in FIG. 1. But the method of marking the AND gates U*a*–U*h* is modified in a way such that the centrally arranged clock pulse generator TG provides only as many timing pulses as may be required to carry out the maximum demanded program, and it is no longer necessary for the network to follow a given order of switching, the alphabetical order of stage designation in FIG. 1.

A connection is established via the switching stages A, B, C, D and E during the program P1. Here, the first and second timing pulse set the switching stages E and D. For program P1, the switching stages C, B and A are marked during the timing pulses "3," "4," and "5." During the program P2, the connection is established successively during the timing pulses "1," "2" and "3" via the switching stages F, G and H. During program P3, the switching stages D and E are marked during the two first timing pulses, as will be apparent by studying the inputs at the coincidence circuits U*d* and U*e*.

By following a similar plan, any arbitrary marking program can be set according to the connections selected by the coincidence circuits U*a* to U*h*. The operations are always carried out with a synchronously running clock pulse generator. The sequence of markings is determined solely by the jumpering of the inputs of the coincidence circuits onto the program bus bars P1, P2 and P3 and the clock pulse bus bars 1, 2, 3, 4 and 5. The time required for the marking period is therefore restricted according to the program to be carried out.

Figure 3:
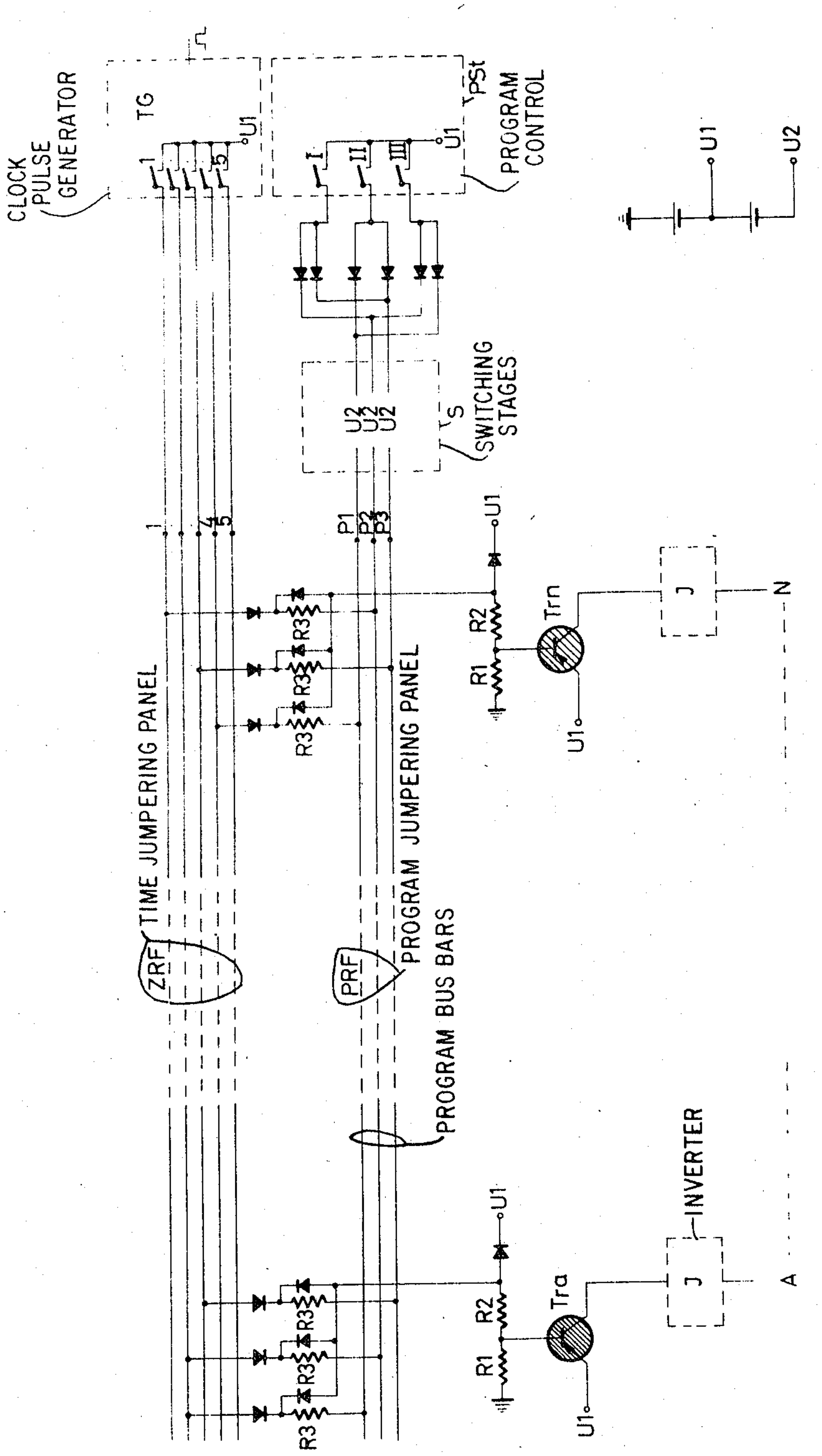
FIG. 3 shows an example of the coincidence circuits.

FIG. 3 shows an example of the coincidence circuits for a switching stage A and a switching stage N. The desired program is marked via the program control circuit PS*t* of the marking logical circuit. In the program control PS*t*, one of the contacts I, II, or III is closed. The program bus bars P1, P2, P3 of the program jumpering panel PRF are actuated via the switching stages S. In a non-operating condition, a voltage U2 is applied to the bus bar. When the contact in the program control circuit PS*t* is closed, the voltage U2 is disconnected from all bus bars, except the selected one. The voltage U2 can therefore be applied to only the connected coincidence circuits via a resistor R3 and diode connected with the bus bar that is selected.

The simultaneously switched on clock pulse generator TG connects and disconnects the contacts 1 to 5 successively and individually. Therefore, the voltage U1 is applied for a short time period to the bus bars "1," "2," "3" of the time jumpering panel ZRF. Corresponding to the jumpering of the inputs of said coincidence circuits, the transistors T*ra* or T*rn*, respectively, are blocked during the associated timing pulses and the marking potential is advanced to the switching stage A or N, respectively, via the inverter I.

Thus, the jumpering of the coincidence circuits in FIG. 3 gives the following program of markings:

Program P1: switching stage A during the timing pulse 2
switching stage N during the timing pulse 4

Program P2: switching stage A during the timing pulse 2
switching stage N during the timing pulse 1

Program P3: switching stage A during the timing pulse 3
switching stage N during the timing pulse 3.

It may be gathered from this program of marking that, solely by jumpering the coincidence circuit, it is possible to determine the moment and the sequence of marking in the switching stages. The switching stages can be marked in a different sequence either in a timely succession or simultaneously.

While the principles of the invention have been described above in connection with specific apparatus and applications, it is to be understood that this description is made only by way of eample and not as a limitation on the scope of the invention.

What is claimed is:

1. A control circuit for a multistage crosspoint arrangement comprising a clock pulse generator providing clock pulses to successive clock pulse bus bars, a program control providing a marking potential to successive program bus bars, a plurality of switching stages, a plurality of coincidence circuits each of which is associated with a corresponding one of said stages and is coupled to receive clock pulses and marking potential, means including said coincidence circuits for applying marking signals to the switching stages of the crosspoint arrangement to control said stages, said marking signals being sent responsive to coincidence between a marking potential representing a program and a selected timing pulse from the clock pulse generator.

2. A control circuit according to claim 1, in which the program control providing a marking potential includes a logic circuit capable of providing a plurality of programs.

3. The control circuit according to claim 1, including connection means for applying a marking potential to any particular switching stage coincident with a clock pulse in accordance with different programs.

4. The control circuit according to claim 1 and means for marking a particular switching stage during several timing pulses in the same program.

5. The control circuit according to claim 1 and means for marking a particular switching stage during several equal timing pulses in different programs.

6. The control circuit according to claim 1 and means for selecting the polarity of the marking potential responsive to a marking by a logic circuit.

7. The control circuit according to claim 6 and means whereby the output potential of the coincidence circuits is determined by the program.

No references cited.

WILLIAM C. COOPER, Primary Examiner